US007679050B2

(12) United States Patent
Samworth

(10) Patent No.: US 7,679,050 B2
(45) Date of Patent: Mar. 16, 2010

(54) METHOD OF ACQUIRING AND PROCESSING NEUTRON LOG DATA, AND RELATED APPARATUSES

(75) Inventor: James Roger Samworth, Ashby de la Zouch (GB)

(73) Assignee: Reeves Wireline Technologies Limited, Leicestershire (GB)

( * ) Notice: Subject to any disclaimer, the term of this patent is extended or adjusted under 35 U.S.C. 154(b) by 0 days.

(21) Appl. No.: 11/857,956

(22) Filed: Sep. 19, 2007

(65) Prior Publication Data

US 2008/0067339 A1 Mar. 20, 2008

(30) Foreign Application Priority Data

Sep. 19, 2006 (GB) ................................ 0618339.6

(51) Int. Cl.
*G01V 5/10* (2006.01)
(52) U.S. Cl. .................................................. 250/269.4
(58) Field of Classification Search ............... 250/269.4
See application file for complete search history.

(56) References Cited

U.S. PATENT DOCUMENTS 4,047,027 A 9/1977 Bateman et al.
4,423,323 A * 12/1983 Ellis et al. .................... 250/264
4,909,075 A 3/1990 Flaum et al.
7,253,402 B2 8/2007 Gilchrist et al.

FOREIGN PATENT DOCUMENTS

| EP | 1686396 | 8/2006 |
|---|---|---|
| GB | 1554949 | 10/1979 |
| GB | 2414544 A | 11/2005 |

OTHER PUBLICATIONS

Dr. Susan Dewar, Patents Act 1977: Search Report under Section 17, May 1, 2007, 2 pages, UK Intellectual Property Office, UK not a publication.

* cited by examiner

*Primary Examiner*—Constantine Hannaher
(74) *Attorney, Agent, or Firm*—Mark A. Oathout

(57) ABSTRACT

A method and apparatus for processing neutron log data having the steps of a) deriving from the near-spaced neutron count of a neutron logging tool an approximate, unfiltered, lithology-related characteristic of a formation; b) deriving a correction that is essentially independent of the lithology; c) long filtering the correction; and d) adding the resulting, long-filtered correction to the approximate, unfiltered characteristic resulting from step a. in order to derive a compensated characteristic. The method provides statistically good, compensated logs while permitting the use of low activity neutron sources.

19 Claims, 5 Drawing Sheets

METHOD OF ACQUIRING AND PROCESSING NEUTRON LOG DATA, AND RELATED APPARATUSES

CROSS-REFERENCE TO RELATED APPLICATIONS

This application claims the foreign priority of GB patent application number 0618339.6 filed Sep. 19, 2006.

STATEMENTS REGARDING FEDERALLY SPONSORED RESEARCH OR DEVELOPMENT

Not Applicable.

This invention relates to a method of acquiring and processing neutron log data, and related apparatuses.

It is known to log boreholes using a neutron logging technique.

In this technique a tool containing a neutron source is inserted into, and caused to travel along, a borehole. As a result the neutron radiation penetrates the surrounding formation. A known phenomenon, resulting from collisions of the neutrons with hydrogen atoms of fluids in pores in the rock, causes only a fraction of the radiation in the formation to return to the tool, which typically contains a pair of neutron detectors. These are capable of generating count rates (i.e. transmissible data signals) that are proportional to the quantity of neutrons returned from the formation.

The count rates may be recorded for example either at a surface location, outside the borehole, to which the logging tool is connected by means of wireline (the nature of which is extremely well known in the art); or in an on-board memory device in the tool. In the former case the count rate data become instantaneously available for processing. In the latter case it becomes possible to process the count rates following recovery of the logging tool to the surface location, at the end of the logging exercise, and downloading of the count rate data.

The logging tool (or related equipment associated with it) also usually includes a means for resolving the signals recorded at any time (t) during the logging operation to the depth, in the borehole, at which the logging tool at time t was located. As a result it is possible to process the signals into a log of the borehole, which may be plotted graphically such that the neutron detector signal values may be related to respective locations in the borehole and/or to lithological characteristics. Knowledge of the responses of the neutron detectors as exemplified by their count rates can provide detailed information about the lithology of the formation surrounding the borehole.

Neutron logging tools have been widely used in the oil and gas industries over the past fifty years as well as in other industries in which it is desired to discover information about the nature of subterranean formations.

The logging tools usually are elongate cylinders. In such tools containing two neutron detectors one of the detectors (often termed the "near-spaced detector") lies closer to the neutron source than the other (which is often termed the "far-spaced detector").

The near-spaced detector of a dual-detector logging tool in use will encounter radiation that has not traveled far (from the source) through the geological formation surrounding the borehole. It follows that the radiation returning to the near-spaced detector from the source is normally statistically good, since the resulting large amount of radiation causes a high count rate in the detector. On the other hand since the radiation reaching the near-spaced detector has not penetrated far into the formation, it is significantly affected by anomalous conditions near to the borehole.

In contrast the radiation that reaches the far-spaced detector is typically less affected by the near-borehole conditions and contains (i.e. implies) much geological information. This is by reason of the radiation travelling further through the formation than the radiation reaching the near-spaced detector, and hence undergoing more collisions with atoms in the formation.

This also means that the far-spaced detector generates comparatively low count rates, so the far-spaced detector counts are statistically poor.

Both the near-spaced and the far-spaced detector counts are subject to perturbations that may have a number of causes including e.g. the nature of any mud circulated in the borehole, whether and in what way the borehole has been cased and numerous other factors that are known to those of skill in the logging art.

A method to reduce the effect of these perturbations, as is well known in the art, is to compute a ratio of the near-spaced count rate to that of the far spaced, and relate this ratio to a desired formation parameter, that is usually the porosity of the formation.

Since the count rate data of the far-spaced detector are statistically poor, these perturbations affect the accuracy of the far-detector data, and therefore the count-rate ratio, considerably more than that of the near-spaced detector count rates alone. This is undesirable since, as noted, the near-spaced counts, although being statistically more precise, are more affected by borehole-based perturbations than are the ratio-based data.

The neutron logging tools hitherto have typically employed Americum-Beryllium ("Am/Be") neutron sources, but for various economic and political reasons these are becoming increasingly scarce. Alternative sources (such as Californium-252 or electronic neutron generator devices) are available, but these are associated with numerous practical problems. In the case of Californium-252 the required source activity is sufficiently high that handling the isotope without extra-ordinary protection presents biological hazards. Neutron generators on the other hand may have significant power requirements and occupy such space as to make them impractical for inclusion in many logging tool designs.

In view of the scarcity of Am/Be neutron sources, and the aforementioned considerations relating to alternative sources, there is now a desire to reduce the activity of neutron sources that are employed in logging tools for the purposes of logging subterranean formations. Currently available neutron count rate processing techniques, however, positively require the use of large and/or active neutron sources in order to provide statistically meaningful data that are not dominated by the aforementioned perturbations.

According to the invention in a first aspect there is provided a method of processing neutron log data including the steps of:

a) operating a neutron logging tool having a first source of neutron radiation, and near- and far-spaced detectors in a borehole in order to acquire neutron log data;

b) deriving from the near-spaced neutron count of the neutron logging tool an approximate, unfiltered, lithology-related characteristic of a formation;

c) deriving a correction that is essentially independent of the lithology;

d) filtering the correction over a long depth interval ("long-filtering" the correction); and e) adding the resulting, long-filtered correction to the approximate, unfiltered characteristic resulting from step a. in order to derive a compensated characteristic, whereby the activity of the said first source is less than the activity of a different source of neutron radiation of the same type as the first source in the said borehole logging tool or the same type of logging tool as the said borehole logging tool when operated without carrying out the steps b)-e) and that generates logs of the same statistical counting variability, with reference to a particular borehole, as the said borehole logging tool when so operated.

Preferably the step of deriving a correction that is essentially independent of the lithology includes:

f) establishing a ratio-based version of the said characteristic of the formation that is substantially independent of the perturbations; and g) subtracting from the ratio-based version of the said characteristic the approximate, unfiltered, lithology-related characteristic of a formation.

In effect the method of the invention calibrates the log produced by the near-spaced detector continuously by comparing it to the compensated ratio-based log, and long-filtering the resultant difference. For reasons explained in more detail below, this has been found to permit the use of a considerably lower activity neutron source than has been possible in the prior art neutron data processing methods.

In one version of the method of the invention the approximate, unfiltered, lithology-related characteristic is an approximate, unfiltered porosity; the ratio-based version of the said characteristic is a ratio-based porosity; and the compensated characteristic is a compensated porosity.

The method of the invention typically also includes the step of supporting a neutron logging tool on wireline and causing it to travel, supported on the wireline, along part or all of the length of a borehole in order to acquire log data, the method further preferably including the step of using the wireline to transmit data from the logging tool to a surface location during travel of the neutron logging tool.

In an alternative arrangement the step of operating a neutron logging tool includes the step of causing an autonomous tool including an on-board power source and an on-board memory device to travel along part or all of the length of a borehole in order to acquire log data, the method then further including the steps of storing the log data in the memory device; subsequently recovering the logging tool to a surface location; and downloading the log data from the memory device to a processing device.

Thus the method of the invention is applicable to log data that may be acquired by either of the two principal ways, in use nowadays, for acquiring such data.

Yet a further possibility is for the step of operating a neutron logging tool to include the step of causing an autonomous tool including an on-board power source, an on-board memory device and a processing device to travel along part or all of the length of a borehole in order to acquire log data; storing the log data in the memory device; and causing the processing device to carry out the steps b) to e) or b) to g) hereof on the thus-stored data.

In other techniques it is possible to provide for real time signalling of log data from a logging tool to a surface location. To this end the step a) of operating a neutron logging tool includes the variant steps of:

q) causing an autonomous tool, including an on-board power source and a signal generator that is operatively connected to the power source, to travel along part or all of the length of a borehole in order to acquire log data, the method further including the step of:

r) causing the signal generator to generate one or more signals that are characteristic of one or more items of log data and transmitting the said one or more signals in real time from the neutron logging tool towards a surface location.

Such a method, if employed, also optionally includes the steps of receiving, decoding and/or processing the said one or more signals at the surface location.

Conveniently the signal generator is capable of generating signal types selected from the list comprising:

fluid pressure pulse signals;
sonic borehole telemetry signals;
electromagnetic borehole telemetry signals.

The foregoing features of the method of the invention confer yet further versatility and choice as regards the manner of its implementation.

It is equally possible to carry out the data processing steps (ie. steps b) to e) or b) to g)) of the method of the invention, as defined hereinabove, on data that is acquired by an independent process.

Further, advantageous features of the method of the invention are set out in Claims 10 to 13 hereof The invention includes within its scope a programmable device that is programmed to carry out the data processing steps defined hereinabove. The invention also extends to data that is processed in accordance with a method as defined herein.

According to a further aspect of the invention there is provided a borehole logging tool comprising a first source of neutron radiation and respective near- and far-spaced detectors, the borehole logging tool carrying out the steps of a method according to any of Claims 1 to 14 whereby the activity of the said first source is less than the activity of a different source of neutron radiation of the same type as the first source in the said borehole logging tool or the same type of logging tool as the said borehole logging tool when operated without carrying out the steps of a method according to any of Claims 1 to 14, that generates logs of the same statistical counting variability, with reference to a particular borehole, as the said borehole logging tool when operated. When considering this aspect of the invention it is helpful to define an "Equivalent Source Activity Factor" (ESAF) measured by comparing Main and Repeat log passes of the logging tool over the same geological interval and defined as:

$$\text{ESAF} = ((\text{Original RMS difference Main-Repeat})/(\text{Compensated RMS difference Main-Repeat}))^2,$$

wherein

"Original RMS difference Main-Repeat" is the root mean square of the difference between respective Main and Repeat logs, carried out using the said borehole logging tool, of a length of borehole; and "Compensated RMS difference Main-Repeat" is the root mean square of the difference between the said Main and Repeat logs that have each been processed in accordance with the data processing method as defined hereinabove.

Preferably the source activity of the borehole logging tool has a value of 1/ESAF wherein ESAF lies in the range not less than unity to not greater than seven.

Plainly in preferred embodiments of the invention the value of ESAF exceeds unity, whereby the activity of the source of the logging tool according to the invention is less than that of an equivalent logging tool not arranged to process neutron log data in accordance with the method steps defined herein.

In another aspect the invention also resides in data produced in accordance with a method as defined herein.

There now follows a description of preferred embodiments of the invention, by way of non-limiting example, with reference being made to the accompanying drawings in which.

Figure 5:
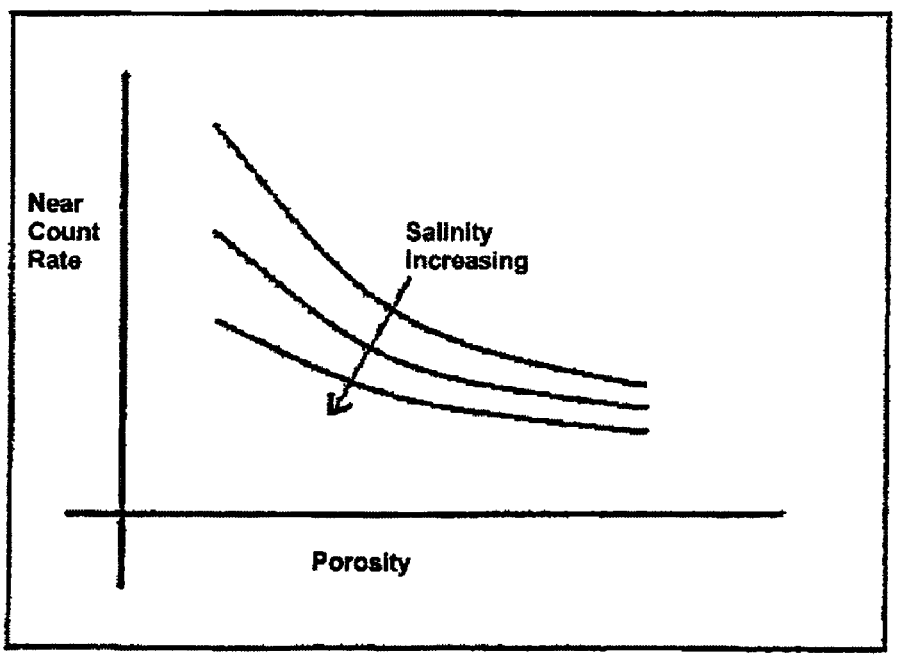
Figure 6:
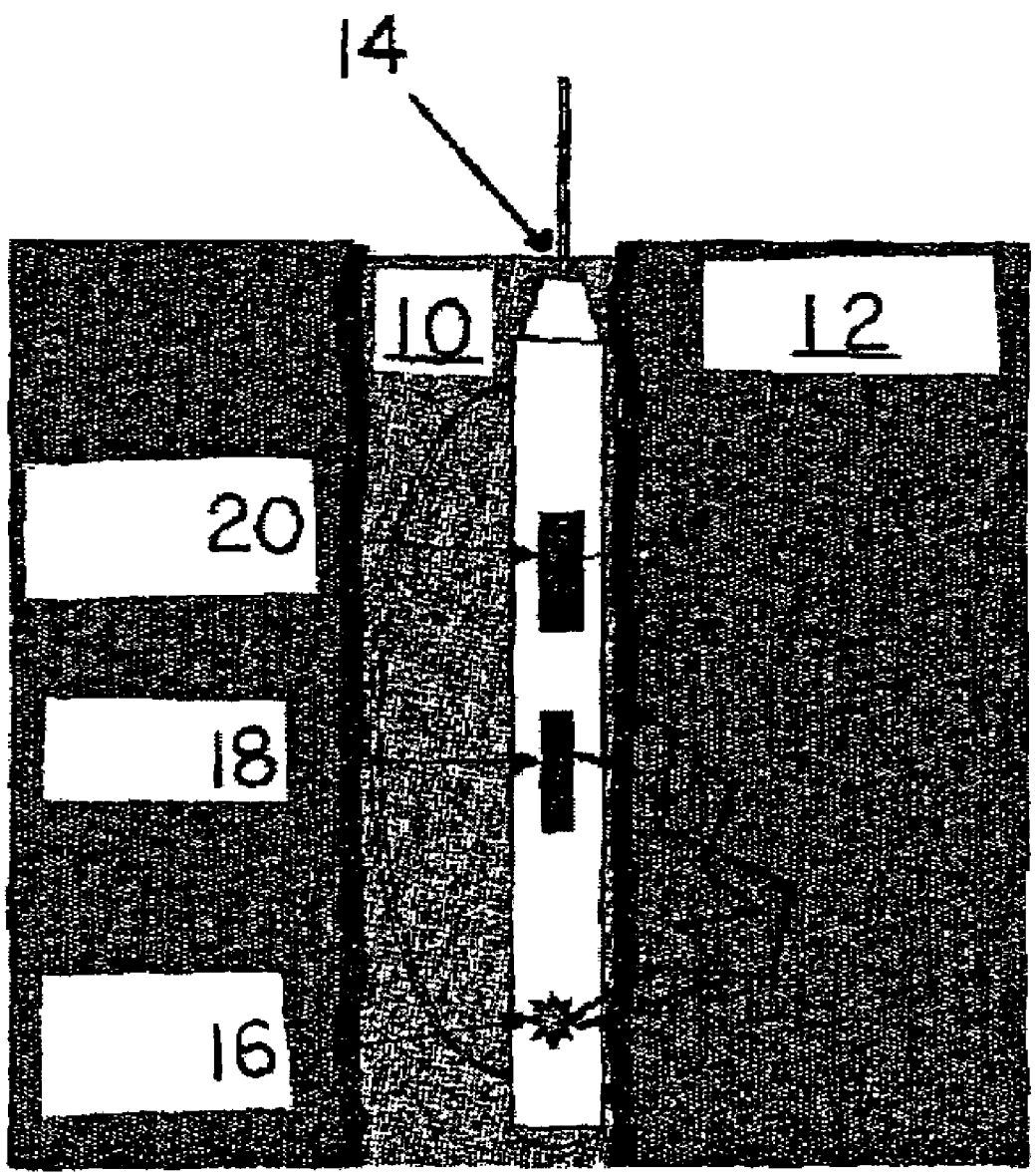

FIG. 5 is a plot that schematically illustrates the effect of varying logged fluid salinity on the logged data; and FIG. 6 is a schematic drawing showing the basic features of a logging tool As discussed hereinabove, there is a general need to use neutron sources, in the logging of subterranean formations, that are of lower activity than have hitherto been used. In use a tool 14 (see FIG. 6) containing a neutron source 16 is inserted into, and caused to travel along a borehole 10. As a result the neutron radiation penetrates the surrounding formation 12. The borehole logging tool 14 has a first source of neutron radiation 16 and respective near- and far-spaced detectors 18 and 20, the borehole logging tool 14 being capable of carrying out the methodology.

Compensated neutron logs are in the prior art formed by taking a ratio of the near-spaced count rate divided by the far-spaced count rate and then relating this to porosity. Taking this ratio offers many advantages by compensating for the various perturbing influences on neutron logs. However, it has the disadvantage that the counting statistics are such that the statistics of the near and far detectors add together as:

$$\sigma^2_{(ratio)}/(ratio)^2 = \rho^2_{(near)}/(near\ count\ rate)^2 + \sigma^2_{(far)}/(far\ count\ rate)^2 \quad (1)$$

where $\sigma^2$ is the relevant variance, which for the count rate is given by the count rate itself, assuming Poissonian counting statistics.

Therefore, $$\sigma^2_{(ratio)}/(ratio)^2 = 1/(near\ count\ rate) + 1/(far\ count\ rate) \quad (2)$$

It can therefore be seen that if the far count rate becomes very low (e.g. with a reduced source activity or with high near/far ratios), this can have a severe influence on the resultant log.

Figure 1:
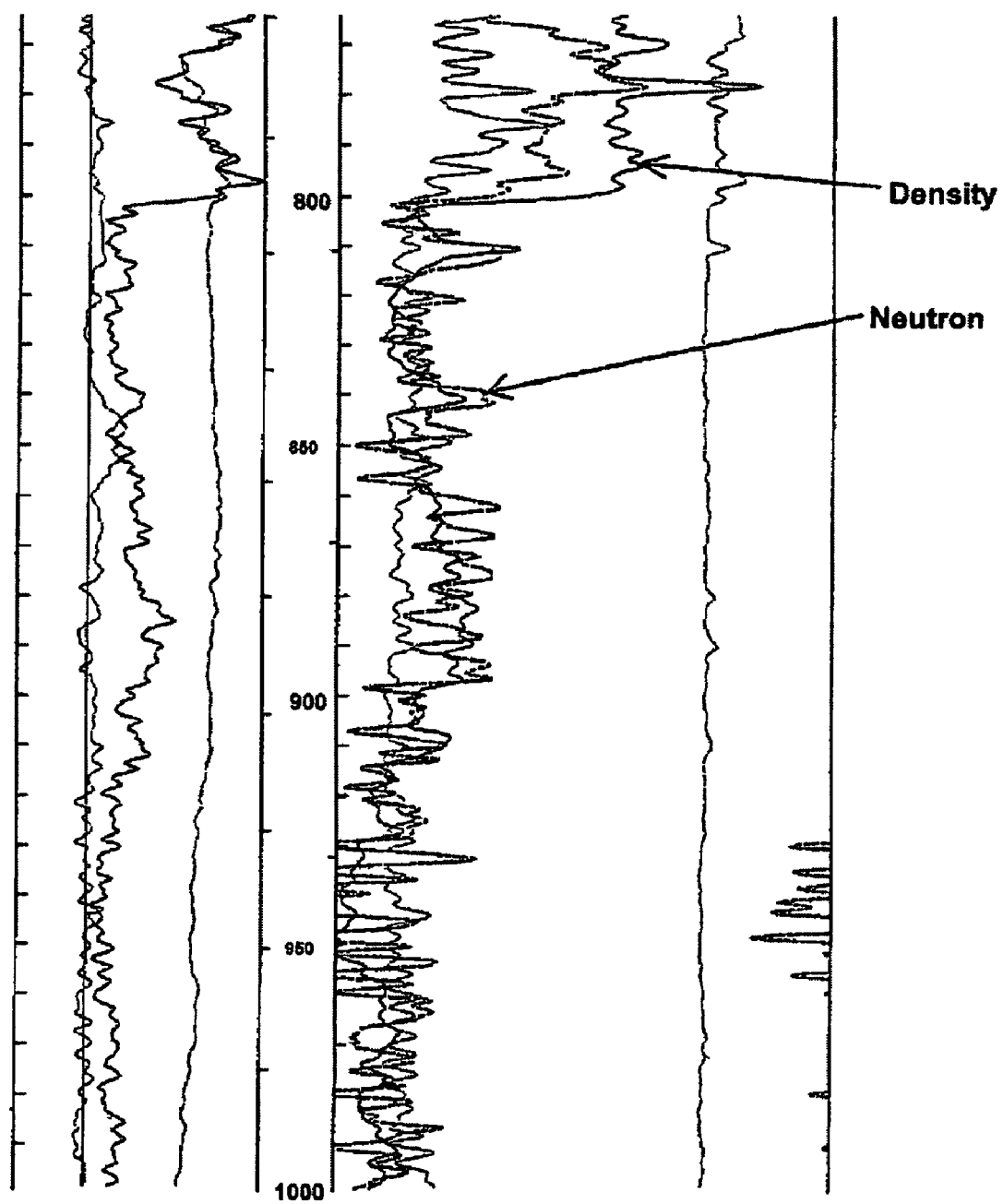
FIG. 1 is a porosity log in its original, uncompensated condition illustrating certain of the disadvantages that the method of the invention aims to solve.

This situation notably occurs in the diatomite reservoirs in California, and also in many cased wells. FIG. 1 shows a log, of a diatomite reservoir, in which the porosity logs are on a scale of 75 to 15 pu (porosity units). The original neutron log is very "statistical" (i.e. influenced by statistical errors) and as a result is of limited utility.

In the neutron log the porosity is usually considered to be a function of the near-spaced count rate divided by the far-spaced count rate. However, both near and far count rates are individually a function of porosity, albeit also a function of all the perturbing influences that the ratio log is designed to reduce.

It is known that one could therefore consider that the porosity is given by:

$$Porosity = function\ of(near\text{-}spaced\ count\ rate) + correction \quad (3)$$

The near-spaced count rate usually has very good counting statistics.

Figure 2:
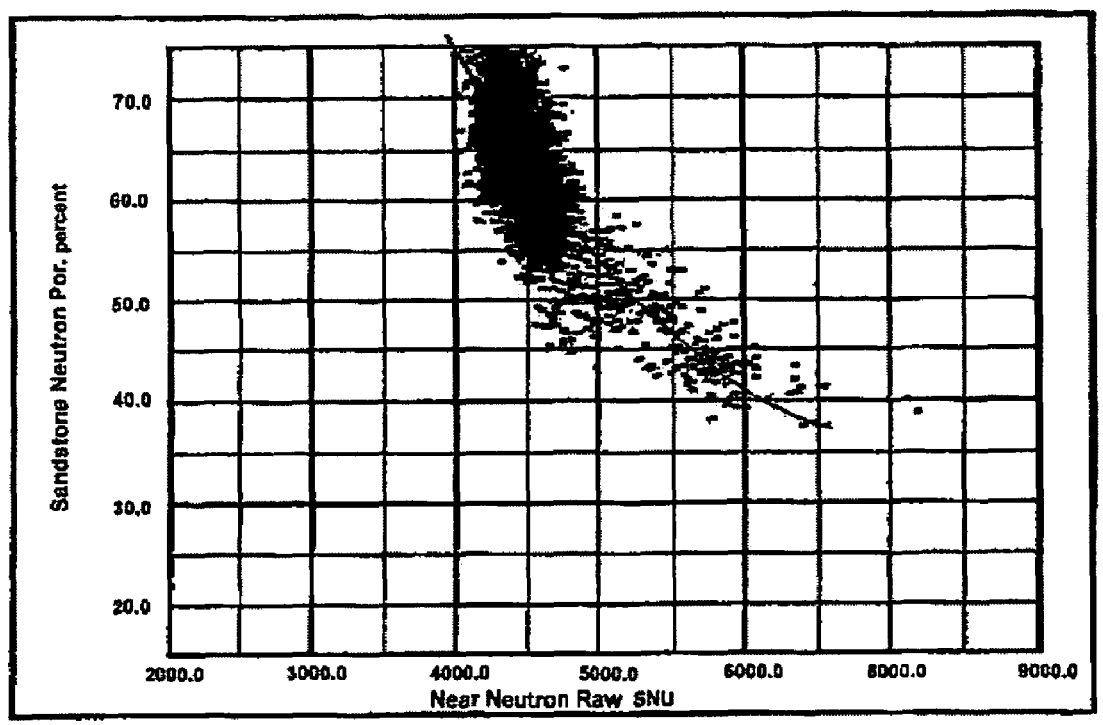
FIG. 2 is a crossplot, based on the FIG. 1 log, of the ratio-based porosity derivable from the FIG. 1 log and the count rate of the near-spaced detector used in the generation of the FIG. 1 log.

It is possible to establish the general trend of the above function by crossplotting the ratio-based porosity against the near count rate, as shown in FIG. 2. In the alternative one may establish an a priori relationship between a "standardised" near count rate and porosity.

A known calibration method for an autonomous (ie. wireline-free) battery memory neutron logging tool (i.e. a tool that is in use in a borehole autonomous and equipped with an on-board power supply and memory that records the logged data) generates a "standard" count rate. This is useable in all autonomous tools of the same type. This "standard" count rate may not be available routinely in other logging tools (whether wireline-supported or of other autonomous types), but it should be easy to generate it given access to the calibration table on the log tail. A method of doing this is discussed hereinbelow.

The result of the approach in Equation (3) is a porosity log that has good statistics and vertical resolution but is, as yet, uncompensated for the perturbations.

The Equation (3) correction may be expressed as:

$$Correction = ratio\text{-}based\ porosity - near\ count\ rate\text{-}based\ porosity \quad (4)$$

If one now makes the assumption, in accordance with the method of the invention, that the correction, being a difference in porosities, is only slowly moving, and does not contain any significant geological information, it becomes possible in accordance with the method of the invention as defined herein to apply a long smoothing filter to the correction before adding it to the near count rate-based porosity to obtain a compensated porosity. The resulting signals retain the advantages both of good statistics and of being ratio-based porosity compensations. In other words, in accordance with the method of the invention:

$$Compensated\ Porosity = near\ count\ rate\text{-}based\ porosity + filtered(ratio\text{-}based\ porosity - near\ count\ rate\text{-}based\ porosity) \quad (5)$$

The worker of ordinary skill in the art will readily understand the terms "slow-moving" and "fast-moving" (and related expressions) in the geological logging context. He will additionally know that slow-moving data typically derive from phenomena that are not strongly influenced by the geological characteristics under investigation.

Similarly the skilled worker will understand that in the context of neutron logging tools the term "long filter" refers to a filter whose length is at least double the near-spaced detector spacing. In practical situations the length of the long filter will be several integer multiples of the near-spaced detector spacing.

Figure 3:
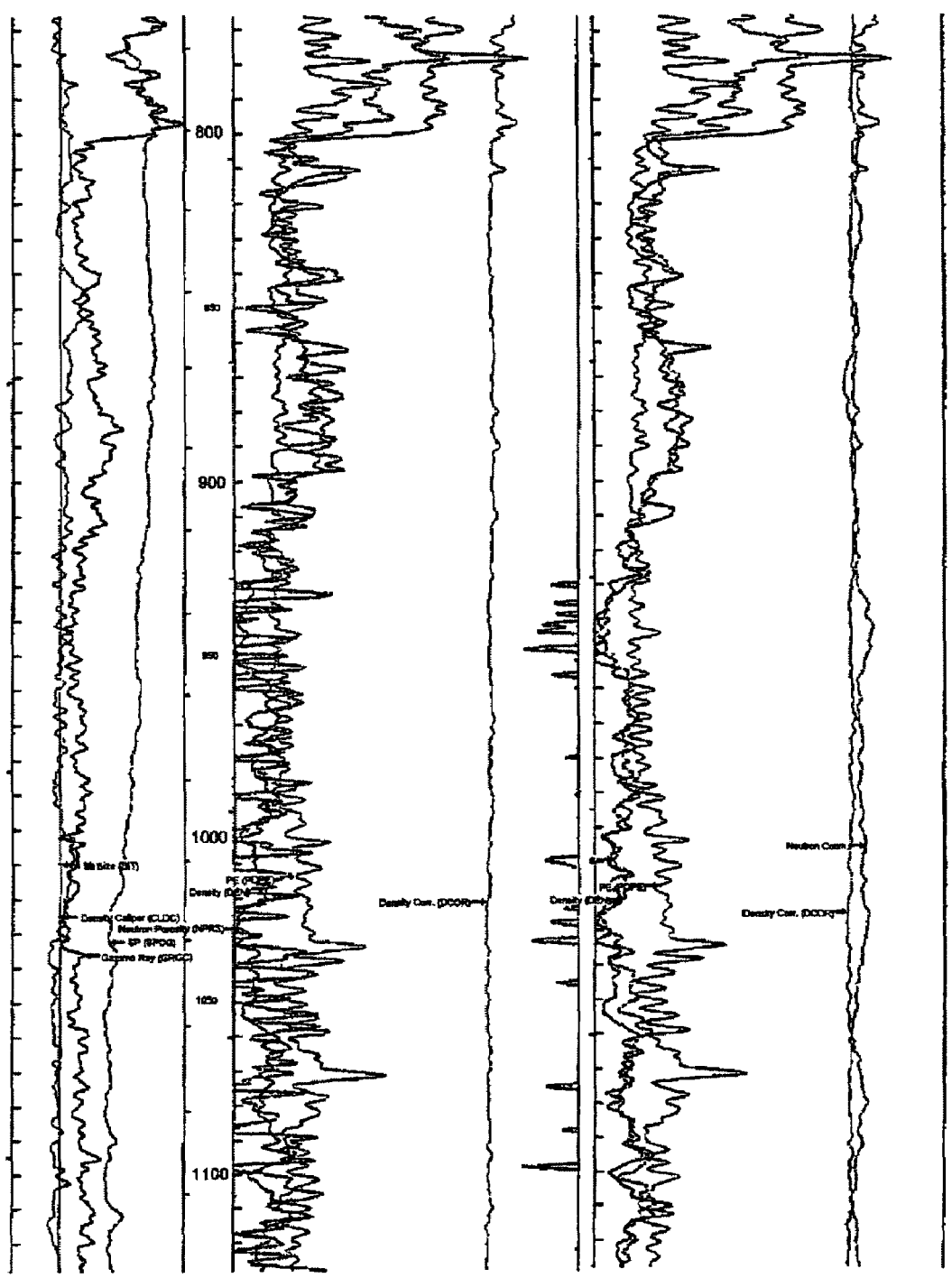
FIG. 3 is a comparison between the FIG. 1 log and the same log following processing of the count rate data in accordance with the method of the invention.

The precise function used to generate the near count rate-based porosity is not critical to the success of the method of the invention, since in the method to a first order the degree of correction changes, according to a continuous, dynamic process. The results of this on the log of FIG. 1 are shown in FIG. 3.

Since the thus-derived, new porosity log is being continually normalised by the normal ratio-based porosity log, no re-characterisation is necessary.

In the prior art it has usually been necessary to resolution match the near and far count rates that generate the ratio-based porosity log in order that boundaries are correctly represented. This matching is not necessary in the method of the invention as the only place that the ratio-based porosity appears is in the long-filtered part of the expression where the boundary information has little relevance.

Figure 4:
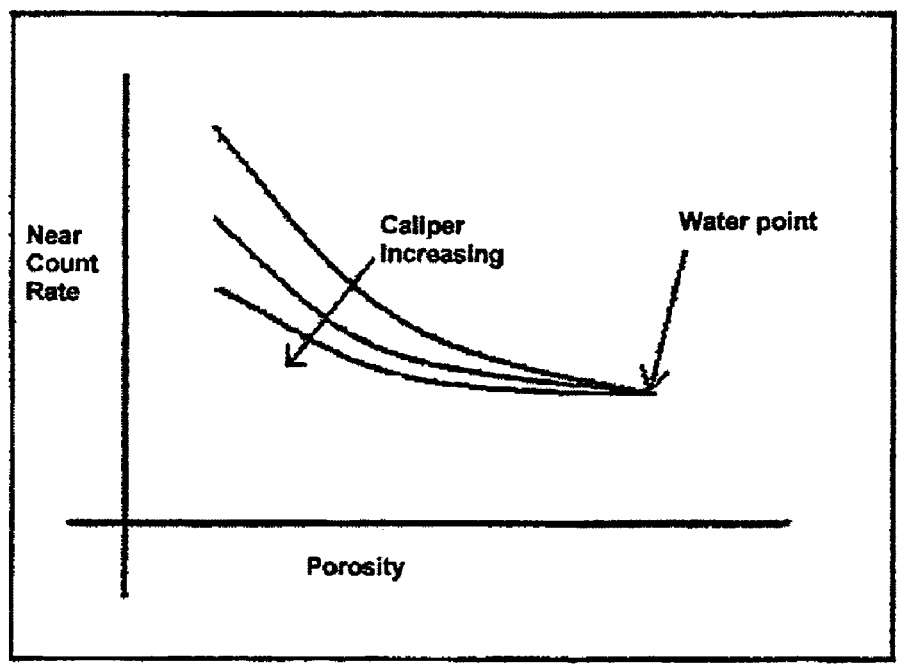
FIG. 4 is a plot that schematically illustrates the effect of varying logging tool caliper on the logged data.

Although the method requires an algorithm to relate the near-spaced count rate to porosity, this need not be particularly accurate as it is continuously calibrated against the compensated neutron log. However, since it is being compared to the compensated log, it should be corrected, if only approximately, for the same environmental effects that are applied to that log. Generally, these are borehole caliper and well fluid salinity. The effects of these variables are illustrated respectively in FIGS. 4 and 5.

In one form of the invention, in order to establish an approximate relationship between the near count rate and porosity in order to correct for the variables, an example of many possible methods is as follows.

Firstly, consider a "reasonable" form for the relationship between count rate and porosity. This could be:

$$I=P*\exp(-k*\Phi)+D \quad (6)$$

where I=count rate; P, k and D are constants; and $\Phi$ is porosity.

For the caliper, or borehole diameter variation, it is possible to consider D to remain constant and P to reduce with increasing caliper. A reasonable caliper relationship might be:

$$P=A*\exp(B/c) \quad (7)$$

where c=caliper; and A and B are constants.

It follows that:

$$I=A*\exp(B/c-k*\Phi)+D \quad (8)$$

In order to correct for borehole fluid salinity, one possibility is to consider that the overall count rate should be modulated by the salinity value. However, it has been found empirically that a better fit to the data can be achieved by using a slightly different relationship for the modulation of A and D.

Thus using a linear relationship:

$$I=A*(1+E*s)*\exp(B/c-k*\Phi)+D*(1+F*s) \quad (9)$$

where s=salinity; and E and F are constants.

It was found that a better fit to the data was achieved if k is also considered to be caliper dependant and has the form:

$$k=G+H/c^2$$

where G and H are constants (10)

Inverting this equation gives:

$$\Phi=(B/c-\log_e(((I-(F*s+1)*D)/(E*s+1))/A))/(G+H/c^2) \quad (11)$$

The various constants in this equation were empirically fitted using a variety of data from both modelling and real wells. The real well data ranged from 12.065 cm (4.75" inches) to 31.115 cm (12.25" inches caliper with fresh and saturated well fluid, for wells with a steel liner, or casing.

As stated previously, the calibration method for one class of autonomous tool generates a "standard" count rate. This "standard" count rate may not be available routinely in other logging systems, but it should be easy to generate given access to the calibration table on the log tail resulting from use of a given tool of a particular type.

From an examination of cased-hole data, it would appear that a good fit in casing can be achieved by a modification of the equation constants. An exact fit is un-necessary as any shift is automatically reversed by the method of the invention.

As noted the above equation is only a very approximate relationship, as this is all that is required by the inventive method.

Repeatability of a logging method can be considered to be controlled by several factors. Depth alignment when comparing two logs is obviously crucial. Less obvious is that there may be non-linear depth alignment issues due to "stick-slip" effects. The tool can also log up different parts of a well, and in these circumstances the repeat quality is governed by the well geometry and the homogeneity (or otherwise) of the lithology. Additionally the tool will have an uncertainty in its measurement. With nuclear tools this measurement uncertainty is due mainly to radiation counting statistics, and this is calculable to a certain extent.

Since the main purpose of the method of the invention is to reduce the log variations due to counting statistics a discussion of this is now in order. It is desirable to derive a calculable number that can indicate whatever improvement may arise. This may be achieved by comparing log repeat passes.

To look at the statistical repeatability of two logs run down the same well, the differences in values between repeat logs needs to be evaluated. The statistical variations of any log, A, can be said to have a variance about a mean value of $\sigma^2_A$. Similarly a repeat log, B, has a variance about a mean value of $\sigma^2_B$. The variance of the difference (A–B) is given by $\sigma^2_A + \sigma^2_B$.

With Poissonian counting statistics, these variances are proportional to the counting rate which is, in turn, proportional to the source activity. Since we are comparing two repeat logs which nominally have the same average value, (ie A=B), then the variance of the difference between the two logs is $2\sigma^2_A$. One may more usually consider the standard deviation of logs, which is the square root of variance. From the foregoing, it can be seen that the repeatability is the square root of $2\sigma^2_A$, and if it is desired to improve the repeatability by a factor of 2 it would become necessary to increase the source activity by $2^2$, or 4.

Therefore, an equivalent to the standard deviation can be calculated as the root mean square (RMS) difference of the logs:

$$\text{RMS} = \left( \sqrt{\left( \frac{\sum ((x_{m1} - x_{r1})^2)}{n} \right)} \right) \quad (12)$$

in which m1=data point from main log r1=corresponding data point (i.e. same depth) from the repeat section n=number of data points To look at the amount of improvement, the RMS difference of the original and the processed logs are compared giving a ratio. If it had been desired to effect an equivalent improvement by increasing the source activity, it would require an increase of the square of this ratio.

Thus an "Equivalent Source Activity Factor" (ESAF) can be defined as:

ESAF=((Original RMS difference Main-Repeat)/(Processed RMS difference Main-Repeat))$^2$  (13)

This gives a simple measure of any improvement. Since non-repeatability is due to other factors in addition to counting statistics, if anything this ratio is likely to be an underestimate of the actual source advantage. It follows that the method of the invention readily permits the generation of statistically good neutron logs while permitting the use of significantly less active neutron sources than have hitherto been possible.

Tests carried out in accordance with the method of the invention have indicated good repeatability, a good fit of the salinity and caliper algorithms with log data; and the possibility to reduce significantly the source activity compared with prior art logging tool techniques.

For the avoidance of ambiguity it should be noted that the methods disclosed and claimed herein are suitable for use during so-called "logging while drilling" (LWD) operations, if necessary following such modification as would be obvious to the worker of skill in the art.

The invention claimed is:

1. A method of determining formation porosity in a region in the vicinity of a borehole wall by producing a neutron log using a neutron logging tool that is operable to irradiate the region with a source of neutrons and, using near and far spaced neutron detectors, detecting the neutrons scattered in the formation, the method including the steps of:
   a) operating said neutron logging tool having a first source of neutron radiation, and near- and far-spaced detectors in a borehole in order to acquire neutron log data;
   b) using a processing device to derive from the near-spaced neutron count of the neutron logging tool an approximate, unfiltered, lithology-related characteristic of a formation;
   c) using the processing device to derive a correction for undesirable perturbations that is essentially independent of the lithology;
   d) using the processing device to long filter the correction; and
   e) using the processing device to add the resulting, long-filtered correction to the approximate, unfiltered characteristic resulting from step a) in order to derive a compensated characteristic, wherein the method permits the use of said first source having an activity that is less than the activity of a source of neutron radiation of the same type as the first source used in said borehole logging tool or the same type of logging tool as said borehole logging tool operating without carrying out steps b)-e) so as to generate one or more logs of the same statistical counting variability with reference to a particular borehole as said borehole logging tool when so operated.

2. A method according to claim 1 wherein the step of deriving a correction that is essentially independent of the lithology includes:
   f) establishing a ratio-based version of the said characteristic of the formation; and
   g) subtracting from the ratio-based version of the said characteristic the approximate, unfiltered, lithology-related characteristic of a formation.

3. A method according to claim 2 wherein the approximate, unfiltered, lithology-related characteristic is an approximate, unfiltered porosity; the ratio-based version of the said characteristic is a ratio-based porosity; and the compensated characteristic is a compensated porosity.

4. A method according to claim 1 wherein the step a) of operating a neutron logging tool includes the step of:
   h) supporting the tool on wireline and causing it to travel, supported on the wireline, along part or all of the length of a borehole in order to acquire log data, the method further including the step of:
   i) using the wireline to transmit data from the logging tool to a surface location during travel of the neutron logging tool.

5. A method according to claim 1 wherein the step a) of operating a neutron logging tool includes the step of:
   j) causing an autonomous tool including an on-board power source and an on-board memory device to travel along part or all of the length of a borehole in order to acquire log data, the method further including the steps of:
   k) storing the log data in the memory device;
   l) subsequently recovering the logging tool to a surface location; and
   m) downloading the log data from the memory device to the processing device.

6. A method according to claim 1 wherein the step a) of operating a neutron logging tool includes the step of:
   n) causing an autonomous tool including an on-board power source, an on-board memory device and the processing device to travel along part or all of the length of a borehole in order to acquire log data, the method further including the steps of
   o) storing the log data in the memory device; and
   p) causing the processing device to carry out the steps of claim 1 on the thus-stored data.

7. A method according to claim 1 wherein the step a) of operating a neutron logging tool includes the steps of:
   q) causing an autonomous tool, including an on-board power source and a signal generator that is operatively connected to the power source, to travel along part or all of the length of a borehole in order to acquire log data, the method further including the step of:
   r) causing the signal generator to generate one or more signals that are characteristic of one or more items of log data and transmitting the said one or more signals in real time from the neutron logging tool towards a surface location.

8. A method according to claim 7 including the further steps of receiving, decoding and/or processing the said one or more signals at the surface location.

9. A method according to claim 7 wherein the signal generator is capable of generating signal types selected from the group of signal types listed as consisting of:
   fluid pressure pulse signals;
   sonic borehole telemetry signals; and
   electromagnetic borehole telemetry signals.

10. A method according to claim 1 including the step of:
    s) correcting the compensated characteristic for variations in values of the borehole caliper and its fluid salinity.

11. A method according to claim 10 wherein the neutron logging tool generates a near- and a far-spaced count rate and wherein the compensated characteristic is a compensated ratio-based porosity, the relationship between the near-spaced count rate and porosity is established by plotting the near-spaced count rate data against the compensated ratio-based porosity and then using a curve-fitting technique.

12. A method according to claim 11 wherein the relationship between the near-spaced count rate and porosity is established using the equation:

$$I = A * \exp(B/c - k * \Phi) + D$$

wherein
  I = count rate;
  A, B, D and k are constants;
  c is the caliper value; and
  $\Phi$ = porosity.

13. A method according to claim 11 wherein the relationship between the near-spaced count rate and porosity is established using the equation:

$$\Phi = (B/c - \log_e(((I - (F*s+1)*D)/(E*s+1))/A)/G + H/c^2)$$

wherein
  I = count rate;
  A, B, D, E, F and G are constants;
  c is the caliper value;
  s is salinity; and
  $\Phi$ = porosity.

14. A method according to claim 1 including the step of:
    t) correcting the compensated characteristic for variations in values of formation fluid salinity.

15. A method according to claim 14 wherein the relationship between the near-spaced count rate and porosity is established using the equation:

$$\Phi = (B/c - \log_e(((I-(F*s+1)*D)/(E*s+1))/A)/G + H/c^2)$$

wherein
I=count rate;
A, B, D, E, F and G are constants;
c is the caliper value;
s is salinity; and
Φ=porosity.

16. A programmable computer that is programmed to carry out the steps b) to e) of claim 1.

17. A method according to claim 1, comprising processing data in accordance with the method of claim 1.

18. A borehole logging tool for use in a borehole of a formation, comprising: a first source of neutron radiation; respective near- and far-spaced detectors; and a processor, the borehole logging tool being capable of carrying out the steps of a method according to claim 1.

19. The borehole logging tool according to claim 18, wherein the source activity has a value of 1/ESAF wherein ESAF as defined herein lies in the range not less than unity to not greater than seven.

* * * * *